(12) United States Patent
Umimura (10) Patent No.: US 12,099,851 B2
(45) Date of Patent: Sep. 24, 2024

(54) INFORMATION PROCESSING APPARATUS AND METHOD FOR CONTROLLING INFORMATION PROCESSING APPARATUS

(71) Applicant: CANON KABUSHIKI KAISHA, Tokyo (JP)

(72) Inventor: Kiyokazu Umimura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 18/171,225

(22) Filed: Feb. 17, 2023

(65) Prior Publication Data

US 2023/0273798 A1   Aug. 31, 2023

(30) Foreign Application Priority Data

Feb. 25, 2022  (JP) ................ 2022-027676

(51) Int. Cl.
*G06F 9/00* (2018.01)
*G06F 9/4401* (2018.01)
*G06F 9/445* (2018.01)
*G06F 15/177* (2006.01)

(52) U.S. Cl.
CPC ............ *G06F 9/441* (2013.01); *G06F 9/4401* (2013.01); *G06F 9/445* (2013.01); *G06F 15/177* (2013.01)

(58) Field of Classification Search
CPC ........ G06F 9/441; G06F 9/4401; G06F 9/445; G06F 15/177; G06F 21/575
See application file for complete search history.

(56) References Cited

U.S. PATENT DOCUMENTS

| | | | |
|---|---|---|---|
| 7,810,088 B2* | 10/2010 | Herle ................ | H04M 1/72406 717/173 |
| 2015/0100955 A1* | 4/2015 | Chen ................. | H04L 67/34 717/170 |
| 2015/0277897 A1* | 10/2015 | Deng .................. | H04W 8/245 717/169 |

FOREIGN PATENT DOCUMENTS

JP       2020053002 A    4/2020

* cited by examiner

*Primary Examiner* — Nitin C Patel
(74) *Attorney, Agent, or Firm* — Canon U.S.A., Inc. IP Division (57) ABSTRACT

A first processor performs a falsification detection on a first boot code based on activation of an information processing apparatus, and in a case where no falsification of the first boot code is detected and version information about the first boot code and version information about a second boot code are different from each other, the first processor overwrites the second boot code with the first boot code after reset processing of a second processor is completed.

12 Claims, 7 Drawing Sheets

INFORMATION PROCESSING APPARATUS AND METHOD FOR CONTROLLING INFORMATION PROCESSING APPARATUS

BACKGROUND

Field

The present disclosure relates to an information processing apparatus and a method for controlling an information processing apparatus.

Description of the Related Art

In typical firmware falsification detection methods for an image forming apparatus (hereinafter, referred to as "MFP"), a sub-central processing unit (sub-CPU) initially reads firmware to be executed by a main central processing unit (main CPU) and verifies whether the firmware is not falsified before the main CPU is activated. In a case where the firmware is falsified, the sub-CPU restores the firmware detected as being falsified by overwriting the firmware with firmware for backup.

In updating firmware, the firmware to be used for updating is downloaded in advance in the background, and at an application time, re-activation is performed, and the firmware is updated with safe firmware. During the updating, whether the firmware to be used for updating is not falsified is verified using the safe firmware, and in a case where the firmware is confirmed as being correct, the firmware is overwritten (e.g., refer to Japanese Patent Application Laid-Open No. 2020-53002).

SUMMARY

According to one embodiment of the present disclosure, an information processing apparatus including a first memory configured to store a first boot code to be executed in activating and version information about the first boot code and a second memory configured to store a second boot code serving as a backup of the first boot code and version information about the second boot code, includes a first processor configured to perform falsification detection on the first boot code, and a second processor configured to be made ready to operate by the first processor causing the second processor to perform reset processing. The first processor performs the falsification detection on the first boot code based on activation of the information processing apparatus. In a case where no falsification of the first boot code is detected and the version information about the first boot code and the version information about the second boot code are different from each other, the first processor overwrites the second boot code with the first boot code after the reset processing of the second processor is completed.

Further features of the present disclosure will become apparent from the following description of example embodiments with reference to the attached drawings.

DESCRIPTION OF THE EMBODIMENTS

Various example embodiments of the present disclosure will be described in detail below with reference to the accompanying drawings. It should be noted that the below-described example embodiments are not intended to limit the scope of the claimed invention and that not all combinations of features described in the example embodiments are always essential to a technical solution provided by embodiments of the present disclosure. While a multi-function peripheral (MFP), such as an image forming apparatus, will be described below as an example of an information processing apparatus according to the example embodiments, the example embodiments are not limited to MFPs.

An MFP serving as an example embodiment to which a method of updating firmware stored in a flash read-only memory (flash ROM) according to an example embodiment of the present disclosure is applied will be described below.

Figure 1:
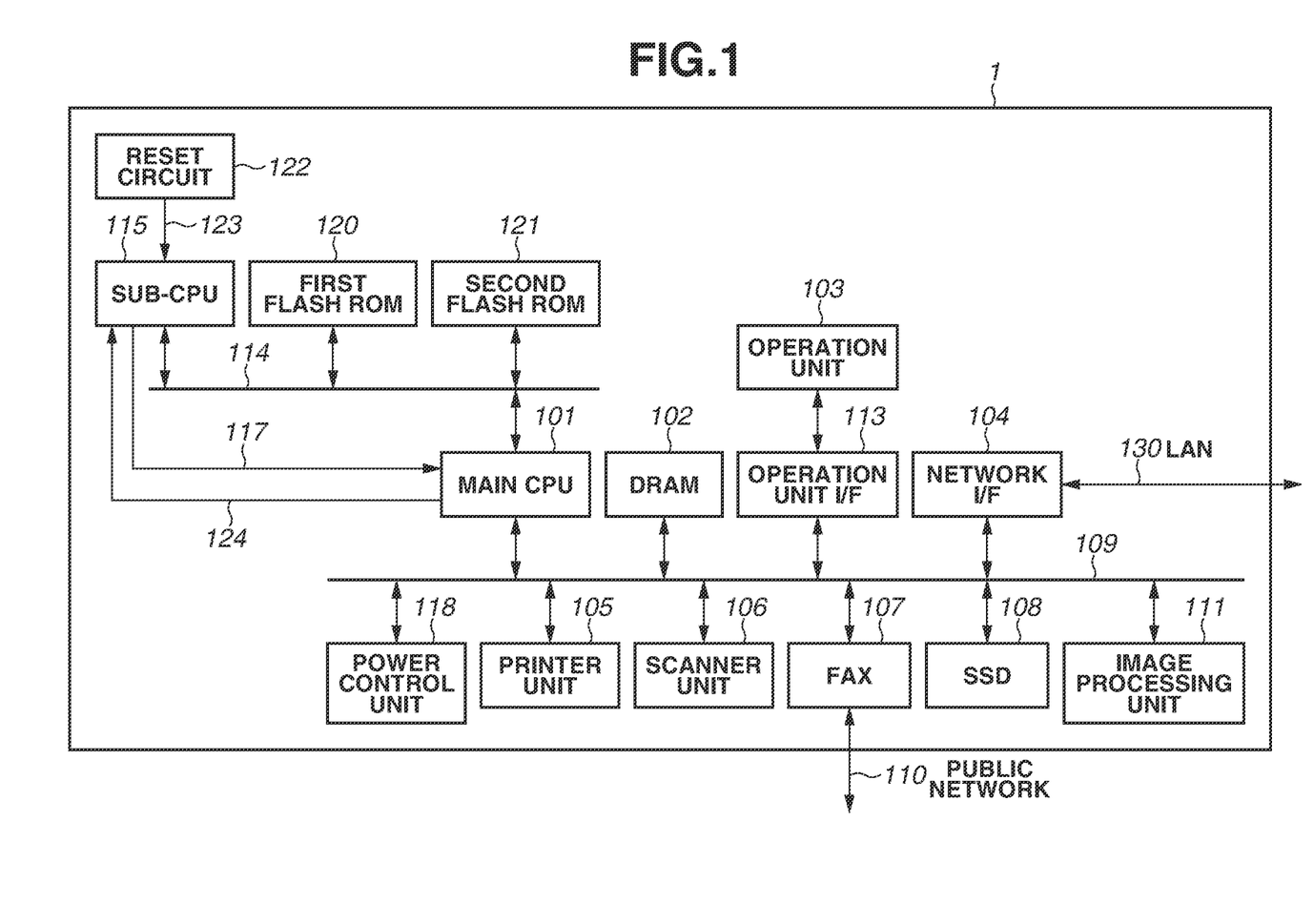
FIG. 1 is a diagram illustrating a configuration of a multi-function peripheral (MFP).

FIG. 1 is a diagram illustrating a configuration of an MFP 10. In FIG. 1, a main central processing unit (main CPU) 101 controls the entire MFP 10. A dynamic random access memory (DRAM) 102 stores programs to be executed by the main CPU 101 and also functions as a temporary data work area. An operation unit 103 notifies the main CPU 101 of user operations.

A network interface (network I/F) 104 connects to a local area network (LAN) 130 and communicates with external devices.

A printer unit 105 prints image data on a sheet. A scanner unit 106 optically scans an image on a sheet, converts the scanned image into an electric signal, and generates a scan image. A facsimile (FAX) 107 connects to a public network 110 and performs facsimile communication with external devices. A solid state drive (SSD) 108 stores programs (e.g., boot loader, operating system [OS], firmware [FW]) to be executed by the main CPU 101 and is also used as a spool area for print jobs and scan jobs. The main CPU 101 executes a program stored in the SSD 108 to execute a print job or a scan job. While an SSD that is a non-volatile semiconductor storage is described as an example of a storage herein, for example, an embedded MultiMediaCard (eMMC) that is a non-volatile semiconductor storage or a hard disk drive (HDD) that is a non-volatile magnetic storage device can be used.

The SSD 108 is also used as an area for storing scan images for reuse. A signal bus 109 connects the modules together and performs communication.

The public network 110 connects the FAX 107 and external devices together. An image processing unit 111 performs conversion processing of converting a print job received via the network I/F 104 into an image suitable for being printed by the printer unit 105 and performs processing, including noise removal, color space conversion, rotation, and compression, on a scan image scanned by the scanner unit 106. The image processing unit 111 further performs image processing on a scan image stored in the SSD 108. A first flash ROM 120 and a second flash ROM 121 store programs including FW to be executed by the main CPU 101 and default setting values of the MFP 10.

The flash ROM 121 is used for backup, and in a case where the flash ROM 120 is falsified, a sub-CPU 115 reads the FW from the flash ROM 121 and overwrites the flash ROM 120 with the FW to restore the flash ROM 120. Thus, the flash ROM 121 is protected so as not to be rewritten. A serial peripheral interface (SPI) bus 114 connects the main CPU 101, the flash ROM 120, the flash ROM 121, and the sub-CPU 115 together. In activating the MFP 10, the sub-CPU 115 reads main CPU FW 401 described below from the flash ROM 120 and verifies whether the main CPU FW 401 is not falsified before the main CPU 101 is activated.

A main CPU reset signal 117 is output from a general-purpose input/output (GPIO) port of the sub-CPU 115 and is input to a reset terminal of the main CPU 101 via a signal line connecting the GPIO port and the reset terminal. An activation notification signal 124 provided from the main CPU 101 indicates completion of initialization. The activation notification signal 124 is output from a GPIO port of the main CPU 101 and is input to an input terminal of the sub-CPU 115 via a signal line connecting the GPIO port and the input terminal. A power control unit 118 controls the supply of power to the modules in the MFP 10.

In a case where a system is turned on, a reset circuit 122 changes a sub-CPU reset signal 123 from "Low" to "High" level after a predetermined delay time. The sub-CPU reset signal 123 is output from the reset circuit 122 and is input to a reset terminal of the sub-CPU 115 via a signal line connecting the reset circuit 122 and the reset terminal. In a case where the sub-CPU reset signal 123 is changed to the "High" level, the resetting of the sub-CPU 115 is cancelled, and the activation of the sub-CPU 115 is started.

Figure 2:
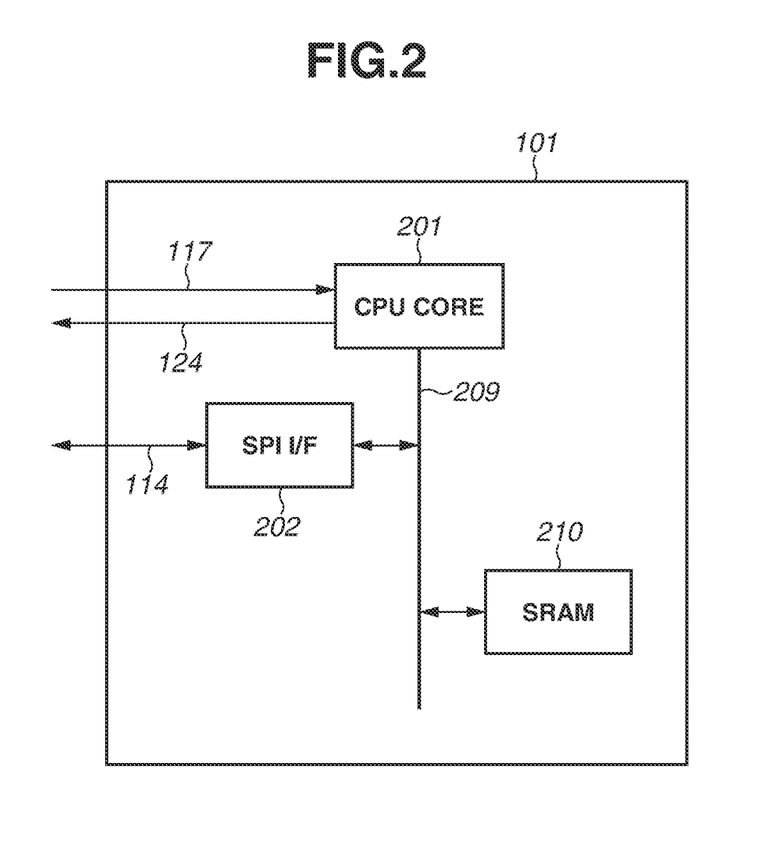
FIG. 2 is a diagram illustrating a configuration of a main central processing unit (main CPU).

FIG. 2 is a diagram illustrating a configuration of the main CPU 101. A central processing unit (CPU) core 201 executes basic CPU functions. A SPI interface (SPI I/F) 202 and external SPI devices are connected together and read and write data from and to each other. A signal bus 209 connects the modules in the main CPU 101 together. A static RAM (SRAM) 210 is used as a work memory.

In a case where the main CPU reset signal 117 is at "Low" level, the main CPU 101 is in a reset state. In a case where the main CPU reset signal 117 is at "High" level, the main CPU 101 is in a reset cancel state. In a case where the main CPU reset signal 117 is changed from the reset state to the reset cancel state, the CPU core 201 initially reads the main CPU FW 401 stored in the flash ROM 120 to the SRAM 210 and executes the read main CPU FW 401. Once the CPU core 201 reads the main CPU FW 401 to the SRAM 210 and is ready to execute the main CPU FW 401, the CPU core 201 changes the activation notification signal 124 from "Low" to "High" level, so that the CPU core 201 notifies the sub-CPU 115 of the activation.

Figure 3:
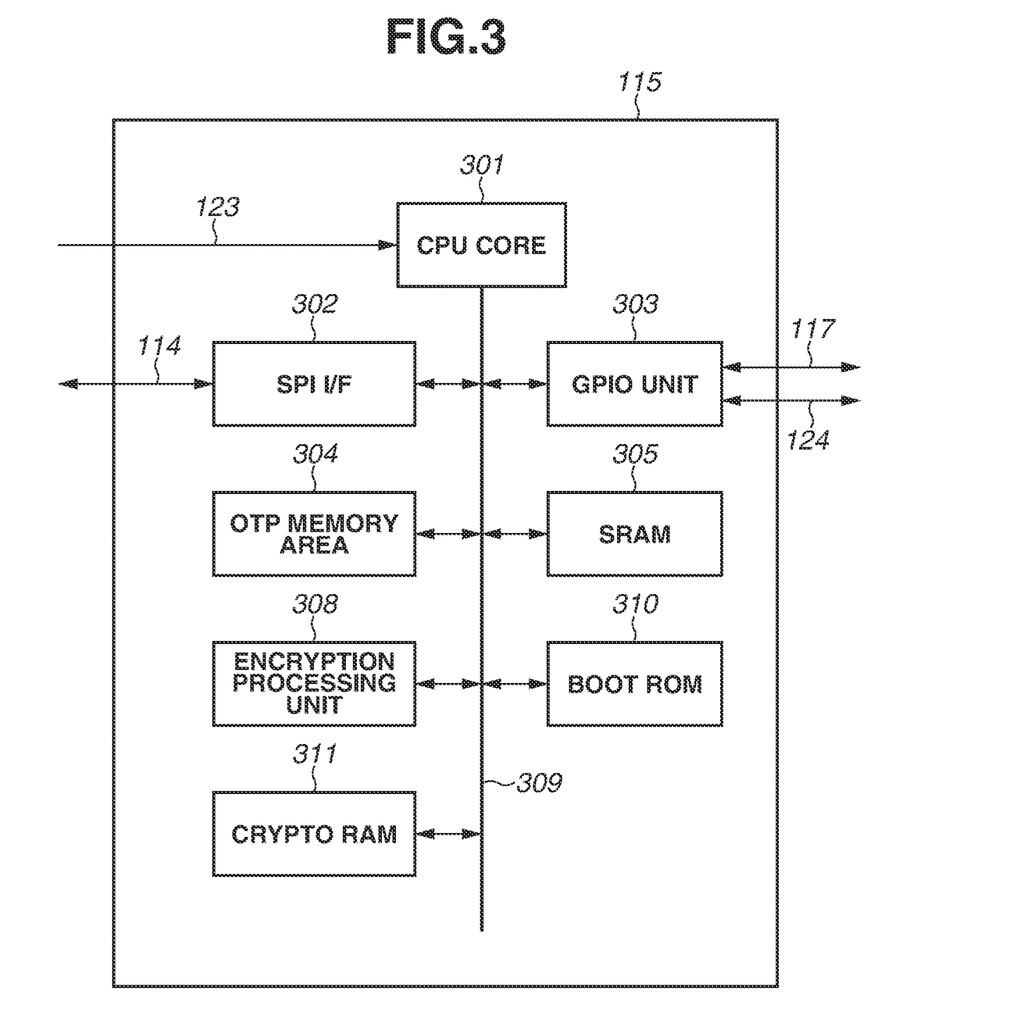
FIG. 3 is a diagram illustrating a configuration of a sub-central processing unit (sub-CPU).

FIG. 3 is a diagram illustrating a configuration of the sub-CPU 115. A CPU core 301 performs basic CPU functions. An SPI I/F 302 and external SPI devices are connected and read and write data from and to each other. A GPIO unit 303 and external devices are connected and transmit and receive data to and from each other. A one-time programmable (OTP) memory area 304 is a memory area, and a value obtained by encrypting a hash value of sub-CPU FW using a public key and a Tag address are written to the OTP memory area 304 during the manufacture.

Once data is written to this area, the written data can never be rewritten.

An SRAM 305 is used as a work memory in the sub-CPU 115. An encryption processing unit 308 decrypts the hash value of the sub-CPU FW from the value encrypted using the public key and also decrypts a hash value of the main CPU FW 401 encrypted using a public key. A signal bus 309 connects the modules in the sub-CPU 115. A boot ROM 310 stores boot codes of the sub-CPU 115. In a case where the sub-CPU reset signal 123 is at "Low" level, the sub-CPU 115 is in the reset state. In a case where the sub-CPU reset signal 123 is at "High" level, the sub-CPU 115 is in the reset cancel state. For example, in a case where the MFP 10 is activated, the sub-CPU reset signal 123 is changed from the reset state to the reset cancel state. The CPU core 301 of the sub-CPU 115 then reads the boot codes of the sub-CPU 115 from the boot ROM 310 and executes the read boot codes. Once the execution of the boot codes is completed, the reset processing of the sub-CPU 115 is completed. Once the reset processing of the sub-CPU 115 is completed, the sub-CPU 115 becomes operable (ready to operate). In the state where the sub-CPU 115 is operable (ready to operate), the sub-CPU 115 can, for example, read a program from the flash ROMs 120 and 121 and execute the read program. A crypto random access memory (crypto RAM) 311 stores highly confidential data for use by the encryption processing unit 308.

Figure 4:
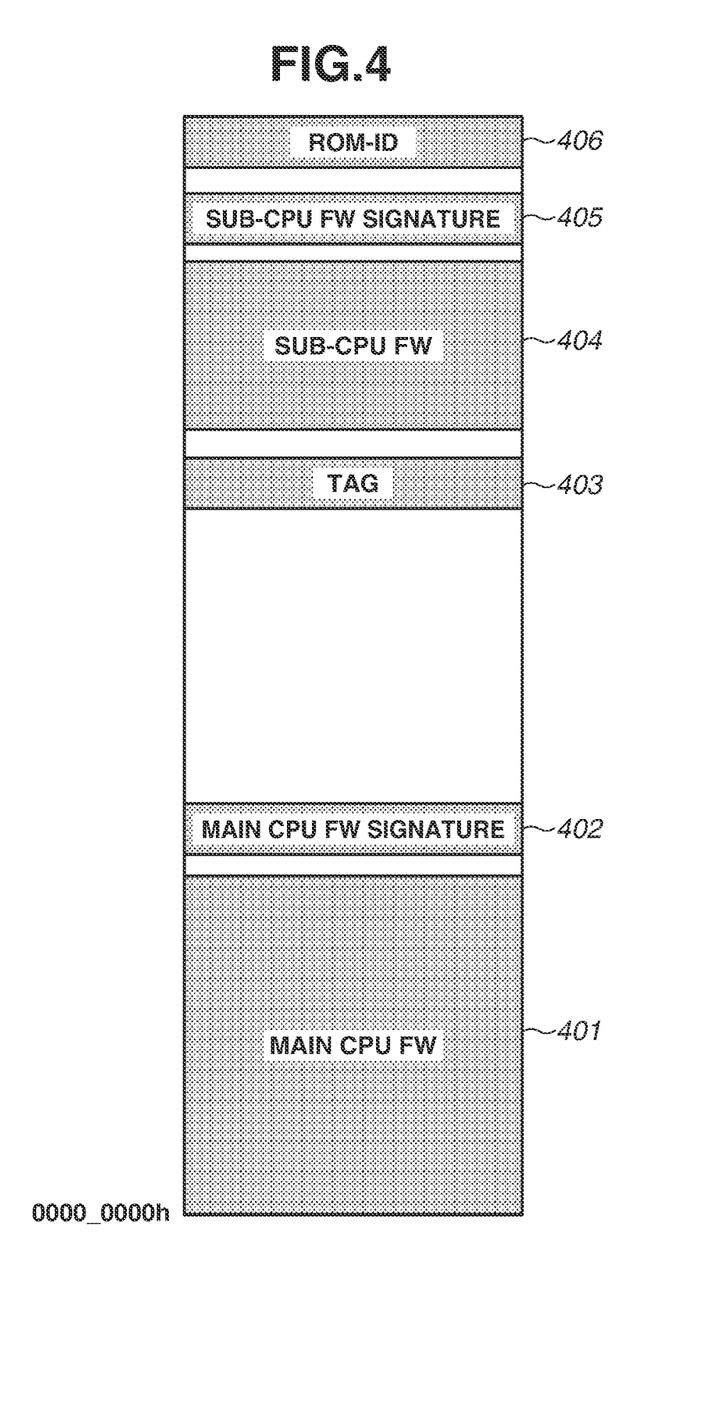
FIG. 4 is a diagram illustrating a memory map of a flash (trademark) read-only memory (ROM).

FIG. 4 is a diagram illustrating a memory map of the first flash ROM 120 and the second flash ROM 121. The main CPU FW 401 stores boot codes (e.g., basic input/output system (BIOS)) to be executed by the main CPU 101. The main CPU 101 executes the boot codes to, for example, read a program from the SSD 108 and execute the read program.

A FW signature 402 stores a Rivest-Shamir-Adleman (RSA) signature value corresponding to the hash value of the main CPU FW 401. A tag 403 stores a head address of sub-CPU FW 404. The address of the tag 403 is stored in the OTP memory area 304. The sub-CPU FW 404 stores codes to be executed by the sub-CPU 115. A FW signature 405 stores the sub-CPU FW 404 or a value of an Elliptic Curve Digital Signature Algorithm (ECDSA) signature of a specific portion of a head of the sub-CPU FW 404. A ROM identifier (ROM-ID) 406 stores a head address, size, version information, and the address of the FW signature 402 of the main CPU FW 401. The first flash ROM 120 and the second flash ROM 121 include a write protection function of preventing data from being rewritten. In a case where the write protection is set for a one-time password (OTP) register area, data at and after an address designated by a register is protected.

In an example of a falsification detection method, initially, public key information (value obtained by encrypting a hash value using a public key) about a digital signature of the main CPU FW 401 is stored in the OTP memory area 304 of the sub-CPU 115 during the manufacture. The read main CPU FW 401 is decrypted using the public key information, and the decrypted main CPU FW 401 is verified. Public key encryption methods are RSA 2048 and ECDSA.

A process of the sub-CPU 115 in activating an information processing apparatus according to the present example embodiment will be described below with reference to a flowchart in FIG. 5. A process after the reset processing of the sub-CPU 115 is completed in activating the information processing apparatus will be described below.

Initially, the sub-CPU 115 performs falsification verification of the sub-CPU FW 404 stored in the flash ROM 120. In step S501, once the sub-CPU reset signal 123 is cancelled, the sub-CPU 115 immediately executes codes in the boot ROM 310 and reads the sub-CPU FW 404 from the flash ROM 120 to the SRAM 305 via the SPI bus 114.

Next, in step S502, the encryption processing unit 308 decrypts the FW signature 405 using the public key in the OTP memory area 304 and obtains a hash value that is a correct answer. Then in step S503, the encryption processing unit 308 calculates a hash value of the sub-CPU FW 404.

In step S504, the sub-CPU 115 compares the hash value obtained in step S502 and the hash value calculated in step S503. If the hash values match (YES in step S504), the sub-CPU 115 reads the sub-CPU FW 404 to the SRAM 305. If the hash values do not match (NO in step S504), the process is ended.

Next, the sub-CPU 115 performs falsification verification of the main CPU FW 401 stored in the flash ROM 120. Initially, in step S505, the sub-CPU 115 reads the ROM-ID 406 from the flash ROM 120 to the crypto RAM 311 and obtains the address of the main CPU FW 401 and the address of the FW signature 402 from the ROM-ID 406. The sub-CPU 115 reads the FW signature 402 to the SRAM 305. The encryption processing unit 308 then decrypts the FW signature 402 using the public key attached to the sub-CPU FW 404 and obtains a hash value that is a correct answer.

Next, in step S506, the sub-CPU 115 reads the main CPU FW 401 to the SRAM 305. The encryption processing unit 308 calculates a hash value of the main CPU FW 401. In step S507, the sub-CPU 115 compares the hash value obtained in step S505 and the hash value calculated in step S506. If the hash values match (YES in step S507), the processing proceeds to step S508. In step S508, the sub-CPU 115 acquires the version information from the ROM-ID 406. If the hash values do not match (NO in step S507), the process is ended.

Similarly, the sub-CPU 115 performs falsification verification of the main CPU FW 401 stored in the flash ROM 121 for backup. In step S509, the sub-CPU 115 reads the FW signature 402 to the SRAM 305. The encryption processing unit 308 then decrypts the FW signature 402 using the public key attached to the sub-CPU FW 404 and obtains a hash value that is a correct answer.

Next in step S510, the sub-CPU 115 reads the main CPU FW 401 to the SRAM 305. The sub-CPU 115 then causes the encryption processing unit 308 to calculate a hash value of the main CPU FW 401. In step S511, the sub-CPU 115 compares the hash value obtained in step S509 and the hash value calculated in step S510. If the hash values match (YES in step S511), the processing proceeds to step S512. In step S512, the sub-CPU 115 acquires the version information from the ROM-ID 406. If the hash values do not match (NO in step S511), the process is ended.

Thereafter, if the acquired version information about the flash ROM 120 and the acquired version information about the flash ROM 121 are different from each other, the sub-CPU 115 upgrades the version of the flash ROM 121 for backup. Initially, in step S513, the sub-CPU 115 compares the version information acquired in step S508 and the version information acquired in step S512. If the version information acquired in step S508 and the version information acquired in step S512 match (YES in step S513 and the processing proceeds to step S515 to be described below), the firmware stored in the flash ROM 120 and the firmware stored in the flash ROM 121 are the same firmware. Thus, the version upgrading is unnecessary. If the version information acquired in step S508 and the version information acquired in step S512 are different (NO in step S513), the processing proceeds to step S514. In step S514, the sub-CPU 115 sets a version upgrade execution flag. In step S515, the sub-CPU 115 controls the GPIO unit 303 and outputs the main CPU reset signal 117 at "High". Thus, the main CPU 101 starts normal activation. A normal activation process that is performed by the main CPU 101 will be described below with reference to FIG. 6.

In step S516, if the version upgrade execution flag is enabled (YES in step S516), the sub-CPU 115 waits until the activation notification signal 124 at "High" is received. If the sub-CPU 115 receives the activation notification signal 124 at "High" (YES in step S517), the main CPU 101 detects the completion of the initialization. In steps S515 to S517, the sub-CPU 115 does not access the first flash ROM 120.

In step S518, the sub-CPU 115 then upgrades the version of the flash ROM 121. The sub-CPU 115 performs the version upgrading after the initialization (reset processing) of the main CPU 101 is completed in order to avoid conflicts over access to the SPI bus 114 shared by the sub-CPU 115 and the main CPU 101. The occurrence of a conflict over bus access may cause the FW stored in the flash ROMs 120 and 121 to be rewritten with incorrect values. If the sub-CPU 115 completes the version upgrade, the process is ended.

Next, a process of activating the main CPU 101 according to the present example embodiment will be described below with reference to a flowchart in FIG. 6. In step S601, once the resetting is cancelled, the main CPU 101 immediately reads the main CPU FW 401 stored in the flash ROM 120 to the DRAM 102. In step S602, the main CPU 101 executes the main CPU FW 401 (boot codes) and initializes input/output in the main CPU 101 (reset processing). In step S603, after the input/output initialization is completed, the main CPU 101 asserts the activation notification signal 124. Once the reset processing is completed, the main CPU 101 can read a program from the SSD 108.

Next in step S604, the main CPU 101 reads the OS from the SSD 108 to the DRAM 102. In step S605, after the OS is read, the main CPU 101 activates the OS. In step S606, the main CPU 101 then initializes the printer unit 105, the scanner unit 106, the FAX 107, the image processing unit 111, the network I/F 104, and the operation unit 103, so that the MFP 10 becomes ready to function.

Figure 5:
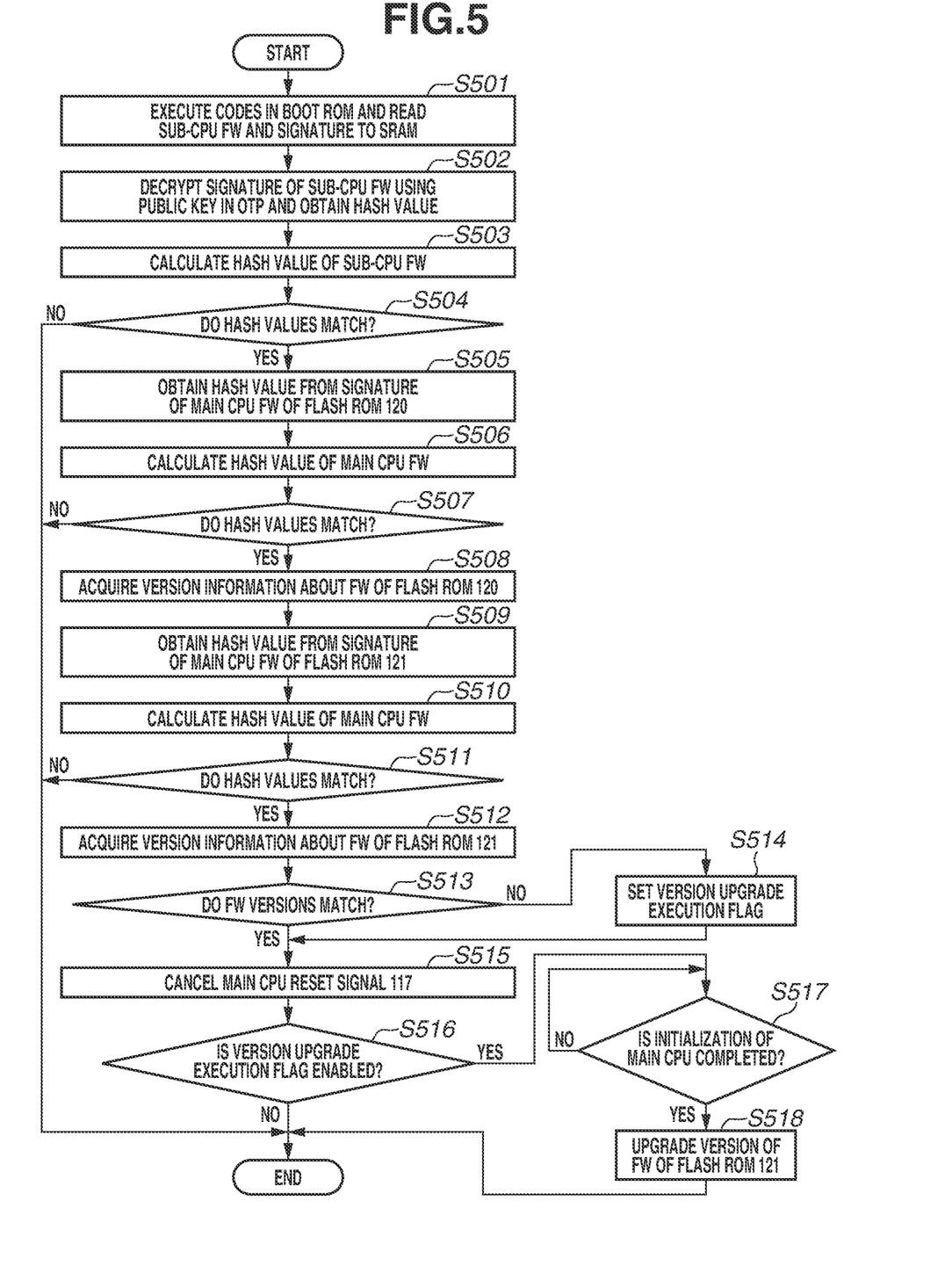
FIG. 5 is a flowchart illustrating a process of the sub-CPU.
Figure 6:
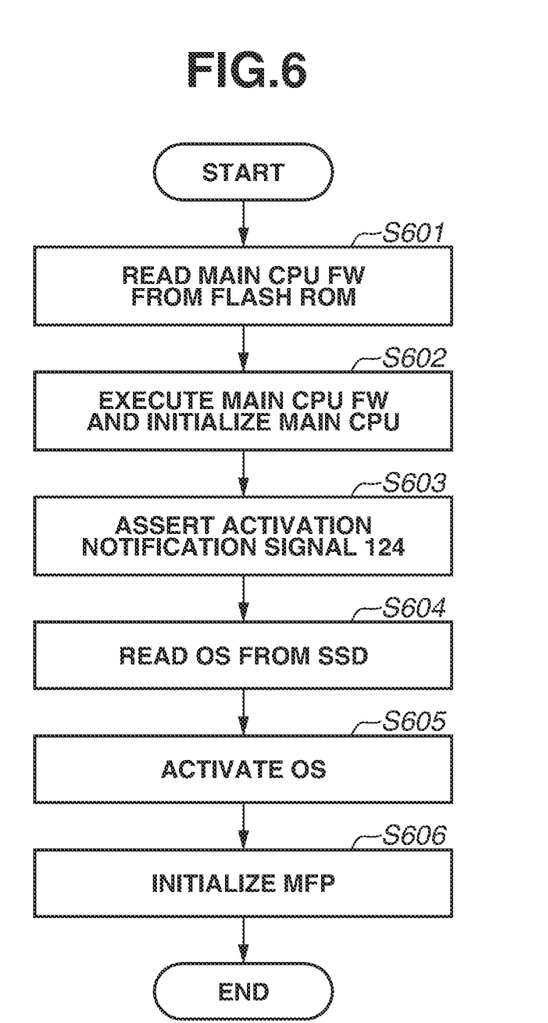
FIG. 6 is a flowchart illustrating a process of the main CPU.

The operations in steps S601 to S603 in FIG. 6 which are performed by the main CPU 101 and the operations in steps S515 to S517 in FIG. 5 which are performed by the sub-CPU 115 are executed in parallel. The operations in steps S604 to S606 in FIG. 6 which are performed by the main CPU 101 and the operation in step S518 in FIG. 5 which is performed by the sub-CPU 115 are executed in parallel. A specific timing chart will be described below with reference to FIG. 7.

Figure 7:
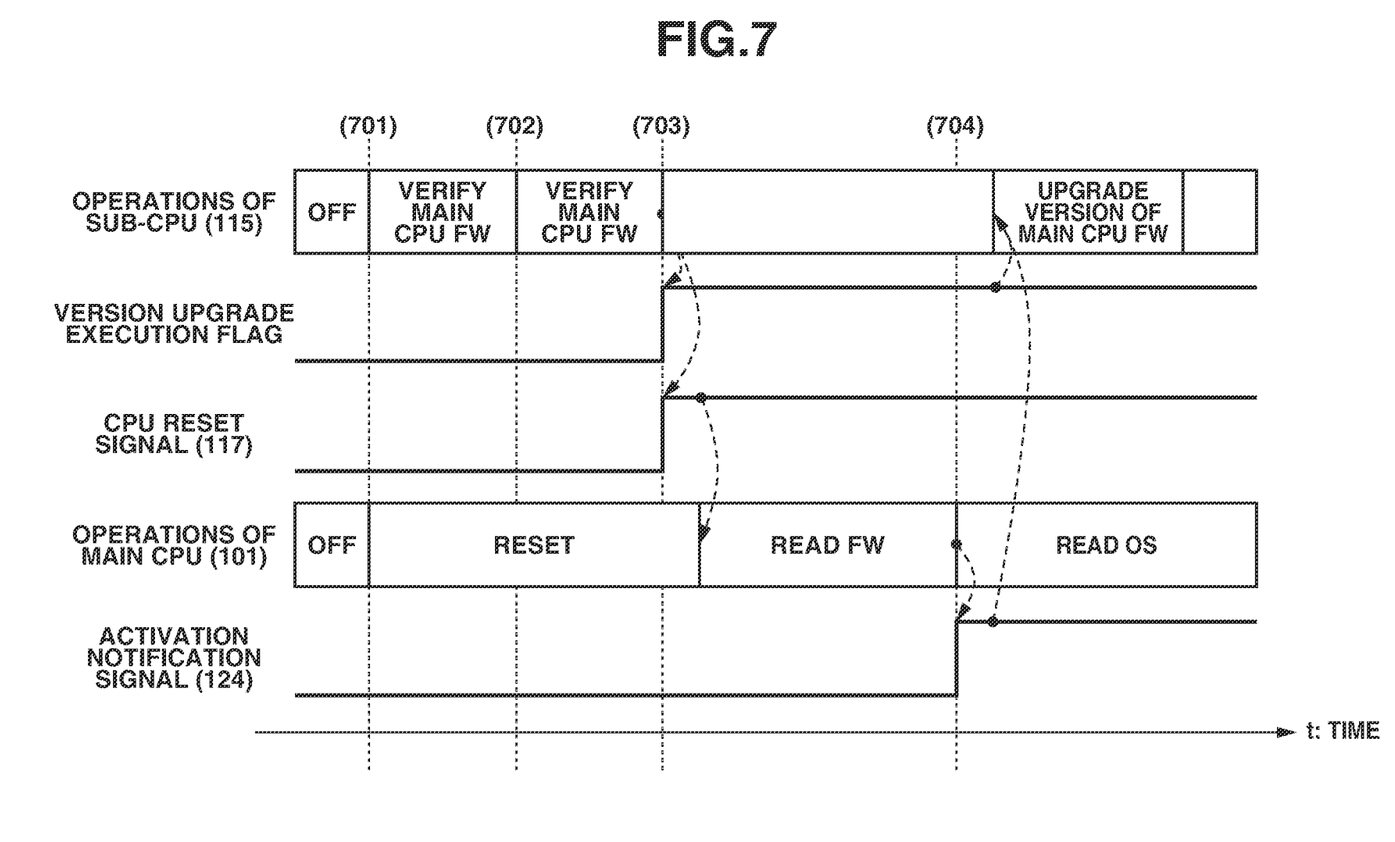
FIG. 7 is a timing chart illustrating the processes of the sub-CPU and the main CPU.

Timings at which the sub-CPU 115 receives the activation notification signal 124 from the main CPU 101 and updates firmware according to the present example embodiment will be described below with reference to a timing chart in FIG. 7. The timing chart in FIG. 7 illustrates operations in a case where the sub-CPU 115 verifies the main CPU FW 401 and determines that the main CPU FW 401 is normal as a result of the verification and version information differs.

At 701, in a case where a main power switch of the image forming apparatus is turned on by a user, power is supplied to the sub-CPU 115 and the flash ROMs 120 and 121. At 702, initially, the sub-CPU 115 verifies the main CPU FW 401 in the flash ROM 120.

At 703, similarly, the sub-CPU 115 verifies the main CPU FW 401 in the flash ROM 121. If the firmware is determined to be normal as a result of the verification, the sub-CPU 115 outputs the main CPU reset signal 117 at "High".

Thus, the main CPU 101 reads the firmware and starts initialization. The sub-CPU 115 compares the version information, and if there is a difference in the version information, the sub-CPU 115 sets a backup execution flag. In response to the initialization of the main CPU 101 being completed, the main CPU 101 asserts the activation notification signal 124, reads the OS, and activates the system. The sub-CPU 115 then receives the activation notification signal 124, detects the completion of the initialization of the main CPU 101, and upgrades the version of the flash ROM 121.

As described above, the sub-CPU 115 upgrades the version of the flash ROM 121 in parallel with the activation of the OS by the main CPU 101. This makes it possible to upgrade the version of the flash ROM 121 without sacrificing user convenience.

While flash ROMs are used in the present example embodiment, other storage devices or apparatuses are applicable.

Other Example Embodiments

While various examples and example embodiments of the present disclosure have been described above, it should be noted that the spirit and scope of the present invention are not limited to any specific description in the present specification.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments are described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2022-027676, filed Feb. 25, 2022, which is hereby incorporated by reference herein in its entirety.

What is claimed is:

1. An information processing apparatus including a first memory configured to store a first boot code to be executed in activating and version information about the first boot code and a second memory configured to store a second boot code serving as a backup of the first boot code and version information about the second boot code, the information processing apparatus comprising:
a first processor configured to perform falsification detection on the first boot code; and
a second processor configured to be made ready to operate by the first processor causing the second processor to perform reset processing,
wherein the first processor performs the falsification detection on the first boot code based on activation of the information processing apparatus, and in a case where no falsification of the first boot code is detected and the version information about the first boot code and the version information about the second boot code are different from each other, the first processor overwrites the second boot code with the first boot code after the reset processing of the second processor is completed.

2. The information processing apparatus according to claim 1, wherein the first processor causes the second processor to start the reset processing after the first processor compares the version information about the first boot code and the version information about the second boot code.

3. The information processing apparatus according to claim 1, wherein the first processor does not access the first memory after the first processor starts the reset processing of the second processor until completion of the reset processing of the second processor.

4. The information processing apparatus according to claim 1, wherein the first processor does not perform the overwriting until the first processor causes the second processor to perform the reset processing and detects completion of the reset processing of the second processor.

5. The information processing apparatus according to claim 1, wherein, in the reset processing of the second processor, the second processor reads the boot code from the first memory and executes the read boot code.

6. The information processing apparatus according to claim 1, further comprising a third memory configured to store at least a program that is to be executed by the second processor and causes a function of the information processing apparatus to be executable,
wherein the second processor executes the program stored in the third memory in parallel with the overwriting that is performed by the first processor.

7. The information processing apparatus according to claim 6, wherein the third memory is a non-volatile semiconductor storage.

8. The information processing apparatus according to claim 1, further comprising a bus connected to the first processor, the second processor, the first memory, and the second processor.

9. The information processing apparatus according to claim 1, wherein the first memory and the second memory are a read-only memory.

10. The information processing apparatus according to claim 1,
wherein the first processor includes a central processing unit core and a read-only memory storing a boot code for the first processor, and
wherein reset processing for the first processor is executed by the central processing unit core executing the boot code for the first processor based on activation of the information processing apparatus.

11. The information processing apparatus according to claim 1, further comprising a bus connected to the first processor, the second processor, the first memory, and the second memory.

12. A method for controlling an information processing apparatus including a first memory configured to store a first boot code to be executed in activating and version information about the first boot code, a second memory configured to store a second boot code serving as a backup of the first boot code and version information about the second boot code, a first processor configured to perform falsification detection on the first boot code, and a second processor configured to be made ready to operate by the first processor causing the second processor to perform reset processing, the method comprising:

causing the first processor to perform the falsification detection on the first boot code based on activation of the information processing apparatus; and     overwriting the second boot code with the first boot code after reset processing of the second processor is completed in a case where no falsification of the first boot code is detected and the version information about the first boot code and the version information about the second boot code are different from each other.

\* \* \* \* \*